Patented May 19, 1931

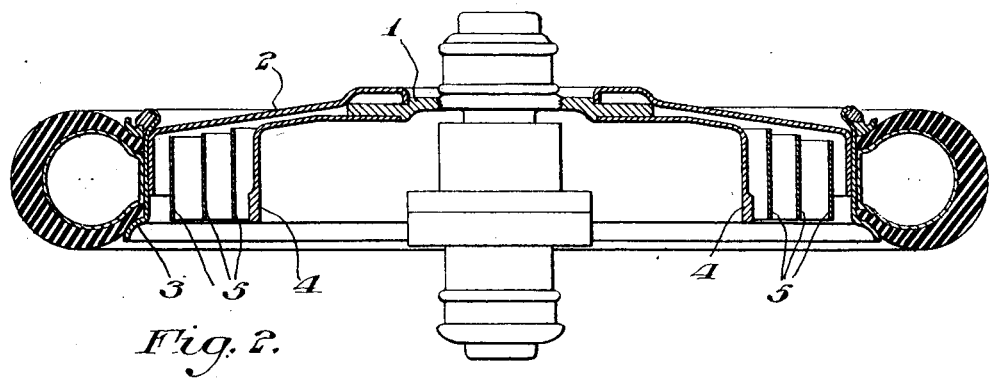
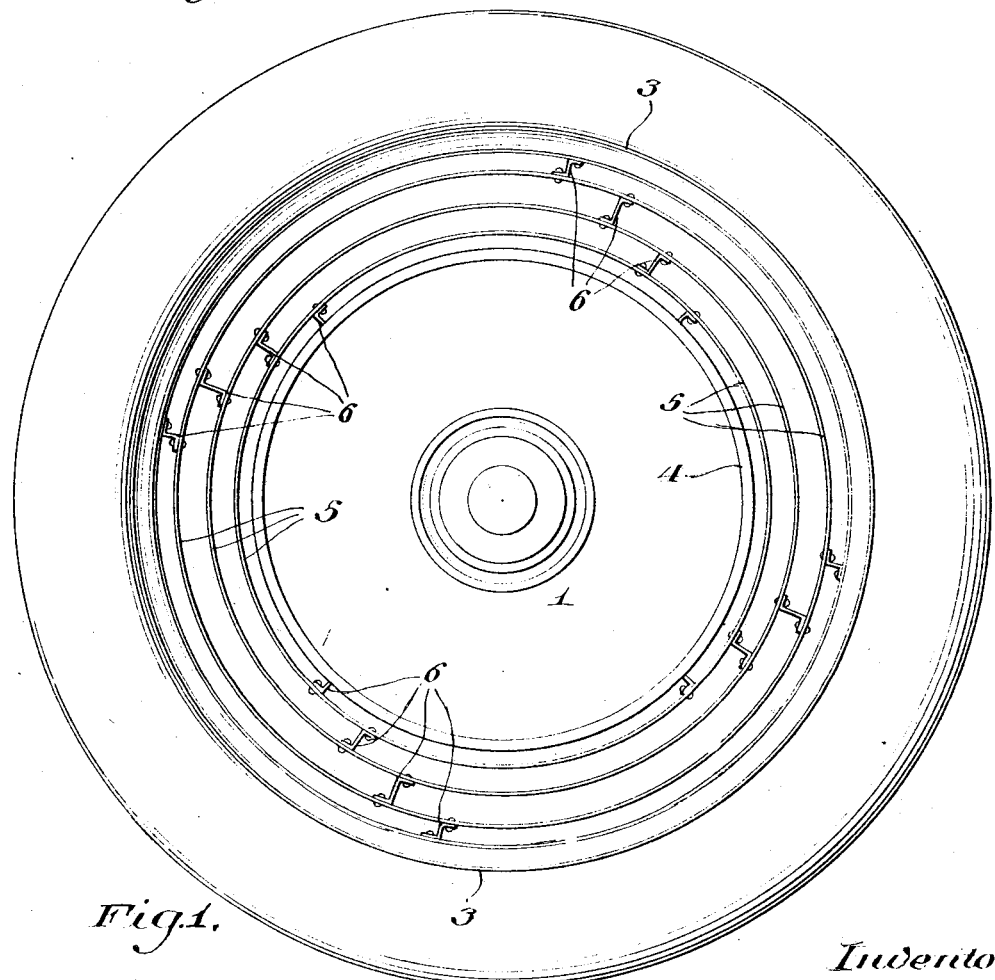

1,805,792

UNITED STATES PATENT OFFICE

ROBERT S. WENTWORTH, OF GERMANTOWN, PENNSYLVANIA, ASSIGNOR TO BUDD WHEEL COMPANY, OF PHILADELPHIA, PENNSYLVANIA, A CORPORATION OF PENNSYLVANIA

COOLING MEANS FOR VEHICLE WHEELS

Application filed December 28, 1926. Serial No. 157,511.

This invention relates to brake drum heat dissipators, particularly adapted to be used upon vehicle wheels, although they could be used in different relationships.

It has been found in practice that the temperature of the tire rims of vehicle wheels increases proportionately to the temperature of the brake drums thereof. This increase in temperature of the rim produces an exceedingly bad effect upon the tires, greatly diminishing their life. Especially is this true in the case of motor truck or bus wheels of the metal type.

In order to overcome this disadvantage it has been proposed to place a band of asbestos or similar material between the brake drum and tire rim. However this band merely acts as a heat dam, not having any radiant ability, holding the drum generated heat against the drum and destroying the inherent radiant quality of the latter. Furthermore, such a band does not stand up to the rigors of actual use, being destroyed by the moisture and dirt accumulated therein.

The primary object of this invention is to provide means for dissipating the drum generated heat by radiation thereof which possesses the qualities of durability and easy adaptation to practical use.

Other objects and advantages are also present in the invention which will become apparent from the following description and claims.

The objects of the invention are accomplished by arranging between the drum and tire rim one or more circular bands of a material having a high degre of heat radiating ability.

An actual embodiment of the invention is shown in the accompanying drawings, wherein, Figure 1 is a view in inner elevation of a wheel employing the invention, and Figure 2 is a sectional view through the same.

The particular form or type of wheel with which the invention may be used is not an essential element of the invention, although it is found more useful with those of the metal disc type. Correspondingly, since any form of braking mechanism is capable of being used with the invention, none has been shown in the drawings.

In the practical embodiment herein described, a wheel of the metal disc type having a hub 1, wheel disc 2, tire rim 3, and brake drum 4 is disclosed. This construction being conventional a more specific description thereof is thought to be unnecessary.

A plurality of metallic bands 5 are arranged between the brake drum and tire rim in spaced concentric relationship therewith and with each other. The number of these bands may differ with varying conditions and types of wheels, the three shown herein being simply an arbitrarily chosen number for purposes of illustration. Similarly the space between the bands themselves and between the rim, drum and bands will be varied under different conditions.

The manner in which these bands are secured in position between the drum and rim is a matter of structural expediency. In the present disclosure a simple and practical form of securing the bands in position has been illustrated. This form comprises the use of securing brackets 6 of substantially a Z-configuration. These brackets are attached to the drum, the bands, and the rim, as shown in Fig. 1, being riveted, welded, or otherwise secured thereto as desired. Also the brackets may be of different vertical heights, so as to have the spaces between the rim, bands and drum correspondingly different. In the embodiment being described, the two intermediate bands are spaced the greatest distance apart, while the space between the drum and the first band is the least.

Although the attaching means have been described as separate brackets, it is well within the contemplation of the invention to use tabs struck from the bands and secured to the adjacent bands, rim, or drum.

The description heretofore given is thought to have amply indicated, that the heat generated in the brake drum during the braking operation will be successively radiated or dissipated off by the bands before the same can materially raise the temperature of the tire rim.

The various embodiments and adaptations which the invention may follow are only to be limited by the scope of the following claims.

I claim:

1. A brake drum heat dissipating device comprising a plurality of radially spaced bands of heat radiating material arranged between the brake drum and tire rim for dissipating by radiation the heat generated in the brake drum and for preventing the same affecting the tire rim.

2. A brake drum heat dissipating device comprising a plurality of bands of heat radiating material arranged between the brake drum and tire rim in spaced concentric relationship thereto and with each other for dissipating by radiation the heat generated in the brake drum and for preventing the same affecting the tire rim.

3. A brake drum heat dissipating device comprising a plurality of circular bands of heat radiating material secured to each other and to the brake drum and tire rim in spaced concentric relationship for dissipating by radiation the heat generated in the brake drum and for preventing the same affecting the tire rim.

4. In combination with a vehicle wheel and a brake drum therefor, a plurality of circular bands of heat radiating material, said bands being arranged in spaced concentric relationship with the brake drum and the tire rim, and brackets attaching said bands to the drum, tire rim and each other.

In testimony whereof he hereunto affixes his signature.

ROBERT S. WENTWORTH.